United States Patent
Olson et al.

[15] 3,663,217

[45] May 16, 1972

[54] BRAZING ALLOY FOR ELEVATED TEMPERATURE SERVICE

[72] Inventors: John Henry Olson, Franklin Lakes; Raymond Francis Vines, Chatham, both of N.J.

[73] Assignee: The International Nickel Company, Inc., New York, N.Y.

[22] Filed: Aug. 7, 1970

[21] Appl. No.: 62,133

[52] U.S. Cl. ..................75/165, 29/196.6, 29/199, 29/504
[51] Int. Cl. ..........................................C22c 5/00
[58] Field of Search .............75/165, 134 C, 134 F, 172

[56] References Cited

UNITED STATES PATENTS

| | | |
|---|---|---|
| 2,050,040 | 8/1936 | Coleman et al............................75/165 |
| 2,123,330 | 7/1938 | Feussner et al..........................75/172 |
| 2,216,495 | 10/1940 | Loebich...................................75/165 |
| 2,274,863 | 3/1942 | Leuser.....................................75/165 |
| 2,304,416 | 12/1942 | Leuser.....................................75/165 |
| 3,136,633 | 6/1964 | Berry.......................................75/165 |
| 3,148,053 | 9/1964 | Spaletta..................................75/165 |
| 3,577,233 | 5/1971 | Gamer..................................75/165 X |

*Primary Examiner*—L. Dewayne Rutledge
*Assistant Examiner*—E. L. Weise
*Attorney*—Maurice L. Pinel

[57] ABSTRACT

Brazing alloy of composition containing gold, nickel, palladium, silver and copper has satisfactory flow characteristics for brazing at a temperature not exceeding 1,900° F. and provides brazed bonds having good strength and oxidation resistance at elevated temperatures such as 1,000° F. or higher.

4 Claims, No Drawings

BRAZING ALLOY FOR ELEVATED TEMPERATURE SERVICE

The present invention relates to brazing alloys and more particularly to alloys for providing brazed bonds having strength and oxidation resistance for service at elevated temperatures.

Brazing processes wherein metal articles are joined by heating a brazing alloy sufficiently to flow the brazing alloy between close fitting surfaces of the articles without fusion thereof are, in general, well known and have long been useful for making sealed bonds at reasonably economical costs. Inasmuch as a brazing alloy should melt completely and flow freely at a temperature below, with a practical margin of safety such as 50° F. below but advantageously for commercial practice about 200° F. or more below, the lowest temperatures which would melt or otherwise detrimentally affect the articles being joined (or other components in proximate relation thereto) brazing alloys have often been made of compositions having relatively low melting temperatures, e.g., 1,000° to 1,500° F. Moreover, it is often commercially desirable to avoid need for brazing at very high temperatures in order to obviate the necessity of especially high-cost heating equipment and production control procedures or to avoid distortion of brazed components or vaporization of alloy elements if brazing is done in vacuum. Accordingly, it is desirable for a brazing alloy to have good flowability at a temperature not greater than 1,900° F.

However, where a brazed bond is required for service at elevated temperatures such as 1,000° F. or somewhat higher, or where the brazed articles must be heat treated at such temperatures after brazing, the need for satisfactory characteristics at elevated temperatures has been in conflict with the need for a low melting point and many brazing alloys characterized by low melting temperatures have unsatisfactory elevated temperature characteristics. For service at elevated temperatures, strength and oxidation resistance are usually required during prolonged periods of exposure to air at the service temperature and it is also highly desired, and sometimes required, to have strength and oxidation resistance for shorter periods at higher temperatures, for instance as a safeguard in event the operating temperature temporarily rises above (or "overshoots") the intended service temperature. Moreover, a brazing alloy should be satisfactory for making joints that are ductile and do not become embrittled at temperatures up to the service temperatures or processing temperatures encountered by the brazed joints.

Some known brazing alloys which have melting ranges that are high enough to provide resistance to melting at 1,500° F. and yet sufficiently low to enable brazing at temperatures not greater than 1,900° F. are not wholly satisfactory for making heat-resistant brazes due to low strength or poor oxidation resistance at elevated temperatures, or to excessive cost or other unsatisfactory characteristics. For instance, an alloy containing about 82 percent gold and 18 percent nickel has been used for joining articles for heat-resistant service but the high proportion of gold therein renders the alloy excessively costly, particularly on a volume basis in view of the high density of gold. Also, better flowability and elevated temperature strength and less tendency to erode structural metals, such as steels, are desirable.

Inasmuch as many heat resistant articles are made of chromium-containing alloys composed largely of nickel, iron and/or cobalt, it is especially important that a brazing alloy for heat-resistant service be satisfactory for brazing such heat-resistant alloys and that the brazing alloy be free from any detrimental tendency to embrittle, erode or corrode such materials. Also, it is specially desirable to have a brazing alloy that is satisfactory for brazing at a temperature in the range of about 1,800° F. to about 1,900° F. inasmuch as the solution-treatment temperatures for some precipitation hardenable, heat-resistant alloys are in or near this range and the heating for brazing should be compatible with desired solution-treatment temperatures of the articles to be brazed. Additionally, and of special importance for providing brazed bonds on articles made of heat-resistant, precipitation hardenable alloys, it is highly beneficial and in many instances practically necessary for the melting temperature range of the brazing alloy to be higher, and desirably at least 200° F. higher, than the heat treating temperatures used to strengthen the articles after brazing.

There has now been discovered a heat-resistant brazing alloy containing specially controlled proportions of gold, nickel, palladium, silver and copper that enables brazing at temperatures not exceeding 1,900° F. and provides brazed bonds having desirable high strength and oxidation resistance at elevated temperatures along with other desirable characteristics.

It is an object of the present invention to provide a brazing alloy.

Further objects of the invention include providing articles joined together by a brazed bond.

Other objects and advantages will become apparent from the following description.

Generally speaking, the present invention contemplates an alloy containing 8 percent to about 14 percent nickel, about 6 percent to about 18 percent palladium, about 15 percent to 20 percent silver, about 5 percent to about 12 percent copper and balance essentially gold in an amount of at least 48 percent and not greater than about 60 percent. The alloy is generally characterized by a liquidus temperature not greater than about 1,900° F., good flowability for brazing at temperatures not greater than about 1,900° F. and good strength and oxidation resistance for service at elevated temperatures such as 1,000° F., or somewhat higher. Furthermore, and importantly, the alloy has good characteristics for brazing flow and wetting on heat-resistant chromium-containing alloys based on nickel, iron and/or cobalt and enables producing ductile brazed bonds to such alloys.

In carrying the invention into practice it is beneficial to especially closely control the brazing alloy composition to contain 10 percent to 12 percent nickel, 12 percent to 14 percent palladium, 17 percent to 19 percent silver, 6 percent to 8 percent copper with the balance being essentially gold in an amount of 49 percent to 51 percent in order to obtain a particularly advantageous combination of strength and oxidation resistance in the brazed condition along with very good flowability at temperatures of about 1,900° F., e.g., 1,875° F., for producing clean brazes having uniform fillets with little or no residue. Furthermore, for producing the alloy in brazing stock product forms such as thin sheet or strip, this closely controlled composition (containing 10 percent to 12 percent nickel) is advantageous for producing ingots with a homogeneous structure and for obtaining good workability characteristics.

Where the balance of the alloy is referred to as essentially gold it is understood that minor amounts of impurities and incidental elements which are not seriously harmful to the basic useful characteristics of the alloy can also be present. Aluminum in amounts such as 0.5 percent or greater is highly detrimental to flowability. Titanium, and possibly also silicon, are deemed likewise detrimental to flowability. Advantageously the amounts of any aluminum, titanium or silicon in the alloy are controlled to be not greater than about 0.1 percent and desirably do not exceed 0.02 percent. Usually the alloy is made of practically pure metals and contains about 99.5 percent or more of nickel, palladium, silver, copper plus gold. Alloy composition percentages set forth herein are by weight unless specified otherwise. Where an alloy is referred to as based on a certain element or group of elements, the base element or group is present in a percentage greater than the percentage of any other element in the alloy and not necessarily 50 percent or more.

The alloy has a ductile structure that has good stability for maintaining ductility and avoiding formation of embrittling precipitates or other detrimental phases during prolonged service at elevated temperatures such as from 1,000° to 1,700° F.

or higher, possibly up to the solidus. Although the temperature of the solidus of course varies somewhat between specific compositions within the ranges set forth herein, the alloy in general does not melt, even incipiently, when heated up to temperatures of about 1,800° F. This is especially beneficial for providing brazed bonds to precipitation hardenable alloys that need to be heat treated at temperatures in the range of about 1,200° F. to about 1,600° F., e.g., 1,300° F. or 1,400° F., for strengthening after brazing. Additional desirable characteristics of the alloy include formation of smooth uniform fillets and freedom from tendency to erode the metals joined.

The characteristics of the alloy of the invention are especially satisfactory for providing brazed bonds to heat-resistant chromium-containing alloys based on nickel, iron and/or cobalt and containing at least about 10 percent chromium, particularly including alloys containing about 12 percent to about 25 percent chromium and at least 50 percent of metal from the group nickel, iron, cobalt and mixtures thereof; such heat-resistant alloys usually have a solidus temperature of at least about 2,400° F.

For the purpose of giving those skilled in the art a better appreciation of the invention, the following illustrative examples are given.

Three brazing alloys, referred to herein as alloys 1, 2 and 3, in accordance with the invention were prepared by induction melting nickel, palladium, silver, copper and gold together under argon in a centrifugal casting unit. Nominal compositions of the alloys were: Alloy 1, 11 percent nickel, 13.5 percent palladium, 18.5 percent silver, 7 percent copper and 50percent gold; Alloys 2 and 3, 12 percent nickel, 7 percent palladium, 17 percent silver, 10 percent copper and 54 percent gold. About 0.05percent each of calcium boride and borax were added for deoxidation of the melts. The molten alloys were centrifugally cast and solidified to ingots in a copper mold. Ingots were cold rolled to strip of about 0.062-inch or less thickness with cold reduction steps ranging from about 10 percent or 20 percent to about 50 percent and with intermediate anneals at about 1,300° F. to about 1,400° F. between cold reductions. For working down to 0.062-inch thickness, alloys 1 and 2 were water-quenched or oil-quenched from annealing temperatures. Cold workability of alloy 1 was excellent and considerably better than the cold workability of alloys 2 and 3. Furthermore, after being cold rolled to about 0.062-inch thickness alloy 1 was annealed for about 1 hour at 1,300° F., furnace cooled to room temperature and then satisfactorily cold rolled down to 0.016-inch thickness with one intermediate furnace-cooled anneal of 1 hour at 1,300° F. at 0.032-inch thickness.

Results of cold rolling alloy 2 showed the workability of alloy 2 was satisfactory for making brazing strip but was not as good as the workability of alloy 1 inasmuch as edge cracking was encountered when rolling alloy 2 down to 0.062-inch thickness with cold reductions of about 50 percent and more severe cracking occurred when attempting to roll down to 0.032-inch after an intermediate anneal of 1,300° F./1 hour/furnace cool (F.C.). Alloy 3 was rolled down in somewhat smaller reductions of about 10 percent to 40 percent with slow cooling, about 200° F. per hour down to about 900° F. from annealing temperatures of about 1300° F. and results were better than were obtained in working alloy 2. After being worked down to 0.068-inch thickness and annealed with slow cooling, alloy 3 was further cold rolled down to 0.017-inch thick strip with three slow-cooled intermediate anneals at 0.045, 0.032 and 0.023 inch thickness. Hardnesses of the alloys were about 25 to 30 Rockwell C in the rolled condition and about 10 to 15 Rockwell C in the annealed condition. Hardness readings on as-cast ingots were higher and more uniform on the 13.5 percent palladium alloy than on the 7 percent palladium alloy and indicated that the structure of the 13.5 percent palladium alloy was more uniformly homogeneous.

Results of using alloys 1, 2 and 3 as brazing alloys for brazing in hydrogen at 1,875° F. to make brazed T-joints and brazed lap joints with strips of AISI Type 410 stainless steel, of composition containing 11.5 percent to 13.5 percent chromium, 0.15 percent max. carbon, 1 percent max. manganese and 1 percent max. silicon, and also to make brazed lap joints with strips of a precipitation hardenable nickel-chromium alloy referred to as alloy X-750, of nominal composition containing 15 percent chromium, 6.75 percent iron, 2.5 percent titanium, 0.8 percent aluminum, 0.85 percent columbium and balance nickel, and results of testing the brazed joints confirmed that the brazing alloy of the invention has good oxidation resistance and strength at elevated temperatures and has good wettability and flowability for brazing at a temperature not greater than 1,900° F.

Results of chemical analyses, shear strength tests and oxidation resistance tests pertaining to alloys 1, 2 and 3 are set forth in the following Table.

TABLE

| Alloy No. | Percent | | | | | Base metal | Shear tests | | Oxidation resistance/oxide penetration depth (mil) |
|---|---|---|---|---|---|---|---|---|---|
| | Ni | Pd | Ag | Cu | Au | | Test temperature | Shear strength K s.i.) | |
| 1 | 11.1 | 13.2 | 18.4 | 7.1 | 50.2 | AISI 410 | R.T. | 56.5 | After 1,000 hr. at 1,000° F.—1.5 to 3. |
| 1 | 11.1 | 13.2 | 18.4 | 7.1 | 50.2 | AISI 410 | 1,200° F. | 19.3 | After 24 hrs. at 1,200° F.—Less than 2. |
| 1 | 11.1 | 13.2 | 18.4 | 7.1 | 50.2 | AISI 410 | 1,300° F. | 11.8 | |
| 1 | 11.1 | 13.2 | 18.4 | 7.1 | 50.2 | AISI 410 | R.T. after 1,000 hours in air at 1,000° F. | 56.5 | |
| 1 | 11.1 | 13.2 | 18.4 | 7.1 | 50.2 | Alloy X-750 | R.T. | 28.4 | |
| 1 | 11.1 | 13.2 | 18.4 | 7.1 | 50.2 | Alloy X-750 | 1,200° F. | 24.6 | |
| 2 | 11.4 | 6.7 | 17.2 | 9.7 | 54.1 | AISI 410 | | | After 1,000 hrs. at 1,000° F.—2 to 3.5. |
| 3 | 12.2 | 7.3 | 16.8 | 10.1 | 53.6 | AISI 410 | R.T. | 65.6 | |
| 3 | 12.2 | 7.3 | 16.8 | 10.1 | 53.6 | AISI 410 | 1,200° F. | 15.3 | |
| 3 | 12.2 | 7.3 | 16.8 | 10.1 | 53.6 | AISI 410 | 1,300° F. | 9.7 | |
| 3 | 12.2 | 7.3 | 16.8 | 10.1 | 53.6 | AISI 410 | R.T. after 1,000 hours in air at 1,000° F. | 55.9 | |
| 3 | 12.2 | 7.3 | 16.8 | 10.1 | 53.6 | Alloy X-750 | R.T. | 39.2 | |
| 3 | 12.2 | 7.3 | 16.8 | 10.1 | 53.6 | Alloy X-750 | 1,200° F. | 23.3 | |

NOTE.— R.T.=Room Temperature.  K s.i.=kips per square inch.

Shear testing was performed using Miller-Peaslee type test specimens (described in American Welding Society Specification C3.2 - 63) cut from ⅛-inch thick sheets of Type 410 stainless steel and of alloy X-750. Prior to brazing, the stainless steel specimens were degreased and acid etched and the alloy X-750 specimens were plated with 0.0005 inch of nickel. The shear strength test specimens of both of these base metals were furnace brazed in dry hydrogen for 40 minutes at 1,875° F. with a brazed overlap distance of 2 inches. Clearance gaps before and after brazing were about 0.002 inch. After brazing, the specimens were air cooled and then the Type 410 stainless steel specimens were annealed for 1 hour at 600° F. to hardnesses of about 38 to 40 Rockwell C prior to testing; also, as indicated in the Table, additional stainless steel shear strength specimens brazed with alloy 1 and with alloy 3 were exposed for 1,000 hours in air at 1,000° F. before being pulled at room temperature. No heat treatment was applied to the alloy X-

750 specimens, which were of a Rockwell A hardness of about 54 after brazing, between brazing and shear testing. Quality of the brazes was highly satisfactory. In the shear tests the specimens were pulled with the brazed joints machined to overlap lengths of 0.5 inch. The elevated temperature shear tests were conducted in air.

Oxidation tests were performed on brazed T-joint specimens of 0.064-inch thick Type 410 stainless steel brazed with alloys 1 and 2. For brazing the T specimens, a 2-inch long T-joint was formed by supporting a 2-inch long by ½-inch wide strip of the stainless steel on edge perpendicularly to and longitudinally along the center of a similar strip and a small piece (about 0.2 grams) of the brazing alloy was fixed in a corner of the T-joint at one end of the specimen. The T-joints were brazed in dry hydrogen at 1,875° F. for 40 minutes. Both alloy 1 and alloy 2 showed good wettability and flowability with flow over the full length of the specimens and formed satisfactory complete fillets along the 2-inch length of the joint. Brazing performance of alloy 1 was superior to that of alloy 2 inasmuch as the fillets made with alloy 1 had especially good uniformity and cleanliness. Neither alloy 1 nor alloy 2 showed any tendency to erode the Type 410 stainless steel. For oxidation resistance testing, specimens of the T-joints brazed with alloys 1 and 2 were exposed in air at 1,000° F. for 1,000 hours and, also, a specimen brazed with alloy 1 was exposed in air at 1,200° F. for 24 hours. The depth of oxide penetration in mils (0.001 inch) was determined by microscopic examination. Specimens of both alloy 1 and alloy 2 showed good resistance to oxide penetration with the best resistance being evident on the brazes of alloy 1, which also showed good resistance for protection against temperature overshoot or heat treatment at 1,200° F. or possibly higher. Oxide penetration after 24 hours at 1,200° F. was scarcely discernible, or possibly nonexistent. However, atmospheric protection is recommended if the brazes are to be subjected to substantially more severe elevated temperature conditions.

Results of testing brazes made with alloy compositions of the invention confirmed that the brazing alloy has good ductility characteristics. The shear strength test results referred to in the Table, and also visual examination of the specimens after testing, indicated that the ductility of the alloy was satisfactory and the alloy did not undergo detrimental embrittlement under the temperature conditions, including the 1,000 hour exposure at 1,000° F., of preparing and testing the specimens and showed that the alloy had good shear strength to resist at least short time exposure, e.g., in event of temperature overshoot, to temperatures of 1,200° F. or somewhat higher. Also, bending tests wherein brazed T-specimens were flattened by compression in a testing machine showed that the vertical leg of the T could be pressed flat against the horizontal leg without breaking or cracking the brazed joint.

Some internal porosity which was found in a line along the center of the brazing alloy layer between the stainless steel strips in T-joint specimens brazed with alloy 2 and exposed in air for 1,000 hours at 1,000° F. is deemed to arise most probably from Kirkendall diffusion and not from internal oxidation inasmuch as the porosity was more prevalent where the thickness of the brazing alloy was relatively great and was also found in specimens exposed for 1,000 hours at 1,000° F. in vacuum instead of air. Microexamination of alloy 1 brazes after 1,000 hour/1,000° F. exposures in air and vacuum showed only traces of porosity, or in some instances no porosity, and, accordingly, for obtaining a sound braze, alloy 1 appeared superior.

In other tests, melting point checks indicated that the 13.5 percent palladium composition, e.g., alloy 1, melts over a smaller temperature interval than the 7 percent palladium composition, e.g., alloys 2 or 3.

The present invention is particularly applicable to providing brazed bonds for joining articles that must be subjected to elevated temperatures in service or in heat treatment after brazing, including vanes and shrouds for gas turbine compressors and fins and tubes for heat exchangers or regenerators. The brazing alloy of the invention is useful for joining nickel-base alloys, iron-base alloys and cobalt-base alloys, including precipitation hardenable nickel-, iron- or cobalt-base alloys containing aluminum, titanium and/or columbium and iron-base alloys that are strengthened by solution treating and quenching, with or without tempering, and may also be used for joining articles made largely of other high melting point metals, e.g., molybdenum, tungsten, columbium or tantalum. The invention is especially useful for providing braze-bonded joints connecting articles (including structures and products) wherein one or more of the joined components is a heat-resistant chromium-containing alloy based on nickel, iron and/or cobalt characterized by a solution temperature in the range of about 1,800° F. to about 2,200° F. or higher and may be a precipitation hardenable alloy characterized by a precipitation hardening heat treatment temperature in the range of about 1,200° F. to about 1,600° F. The invention is also specially applicable for providing brazed bonds to quench-hardening steels characterized by solution treatment temperatures in the range of about 1,400° F. to 1,900° F.

Although the present invention has been described in conjunction with preferred embodiments, it is to be understood that modifications and variations may be resorted to without departing from the spirit and scope of the invention, as those skilled in the art will readily understand. Such modificatons and variations are considered to be within the purview and scope of the invention and appended claims.

We claim:

1. A brazing alloy containing 8 percent to about 14 percent nickel, about 6 percent to about 18 percent palladium, about 15 percent to 20 percent silver, about 5 percent to about 12 percent copper and the balance essentially gold in an amount of at least 48 percent and not greater than about 60 percent of the alloy.

2. An alloy as set forth in claim 1 containing 10 percent to 12 percent nickel, 12 percent to 14 percent palladium, 17 percent to 19 percent silver, 6 percent to 8 percent copper and 49 percent to 51 percent gold.

3. An alloy as set forth in claim 1 containing about 11 percent nickel, about 13.5 percent palladium, about 18.5 percent silver, about 7 percent copper and about 50 percent gold.

4. An alloy as set forth in claim 1 containing about 12 percent nickel, about 7 percent palladium, about 17 percent silver, about 10 percent copper and about 54 percent gold.

* * * * *